(12) United States Patent
Wu

(10) Patent No.: US 7,295,686 B2
(45) Date of Patent: Nov. 13, 2007

(54) METHOD OF PROCESSING RED EYE IN DIGITAL IMAGES

(75) Inventor: Shang-Yun Wu, Beijing (CN)

(73) Assignee: Primax Electronics Ltd., Neihu, Taipei (TW)

( * ) Notice: Subject to any disclaimer, the term of this patent is extended or adjusted under 35 U.S.C. 154(b) by 857 days.

(21) Appl. No.: 10/671,770

(22) Filed: Sep. 29, 2003

(65) Prior Publication Data

US 2005/0069219 A1    Mar. 31, 2005

(51) Int. Cl.
*G06K 9/00* (2006.01)
(52) U.S. Cl. .......... 382/117; 382/103; 382/165
(58) Field of Classification Search ........ 382/117, 382/118, 103, 225, 291, 164, 165, 190, 228; 340/5.53, 5.83; 345/171, 172
See application file for complete search history.

(56) References Cited

U.S. PATENT DOCUMENTS

| | | | |
|---|---|---|---|
| 6,252,976 B1 | 6/2001 | Schildkraut et al. | 382/117 |
| 6,792,134 B2 * | 9/2004 | Chen et al. | 382/117 |
| 6,895,103 B2 * | 5/2005 | Chen et al. | 382/117 |
| 6,920,237 B2 * | 7/2005 | Chen et al. | 382/117 |
| 6,980,691 B2 * | 12/2005 | Nesterov et al. | 382/165 |
| 7,058,209 B2 * | 6/2006 | Chen et al. | 382/117 |

OTHER PUBLICATIONS

Recent Research and Development in Human Face Detection May 2003, vol. 24, No. 3, pp. 75-79, Journal of Jiangsu Univ. (Natural Science Edition), China, Liang-min Wang et al.
The localization and extraction of eyes for features of human face images, Mar. 2003, vol. 14, No. 1, pp. 35-39, Journal of Guangxi Univ. of Technology, China, Ying-chun Hu et al.

* cited by examiner

*Primary Examiner*—Anh Hong Do
(74) *Attorney, Agent, or Firm*—Birch, Stewart, Kolasch & Birch, LLP

(57) ABSTRACT

In a method of processing red eye in digital images, a skin area is first determined in an image. Then all inner boundaries within the skin area are picked up. The inner boundaries are matched with an eyelid quadratic curve to determine the location of the eyelid area. Red pixels within the eyelid area are then detected and filled up. A quadratic curve model can be further used to localize an iris area within the eyelid area to improve the precision of red eye localization as well as the processing speed.

10 Claims, 6 Drawing Sheets

METHOD OF PROCESSING RED EYE IN DIGITAL IMAGES

BACKGROUND OF THE INVENTION

1. Field of Invention

The invention relates to a method of processing digital images, and more particularly to a method of processing red eye in digital images.

2. Related Art

Digital image processing technology has found wide application in the market of electronic appliances. When a digital photo is taken, the eyes of people or animals may appear red on the photo. This is due to the fact that in dark environments, human or animal eye pupils are more dilated and form a greater open area. Therefore, a flash for which the light axis is closer to the light axis of the camera objective lens will likely reflect on the back of the eye of the photographed subject toward the objective lens. The back of the eye is usually full of red capillaries, which make the subject's eye appear as a red spot on the photo.

As new generations of cameras are promoted, it can be observed that the distance that separates the flash lamp from the camera objective lens is decreasing. This is due to a current design trend that particularly focuses upon the size and portability features of the camera. With the flash lamp being closer to the camera objective lens, the problem of red eye is even more severe.

Although some more advanced cameras are promoted as having anti-red eye operating modes, the problem of red eye is still common in digital images. In traditional mechanical cameras, red eyes are eliminated by using a pre-flash that forces the eye pupils to contract so as to attenuate the reflection of red light at the subsequent flash. However, this technique has limited results, and is not really able to completely eliminate the appearance of red eyes.

Some of present software products available on the market provide red eye elimination functions in post-processing stages. However, these software products use implemented processing methods that require the user's manual operation to adjust and find the location of the red eye, and subsequently determine its color. Only thereafter is the red eye covered up. As a result, these methods of the prior art usually need several adjustments, and consequently are slower and require substantial intervention from the user. If a substantial number of images have to be processed, the processing efficiency is significantly low.

Software products that automatically eliminate red eyes are also known in the art, and they provide convenient operations that do not need intervention from the user. However, these known software products usually use an oval shape or a pattern close to a visage shape as models to determine the visage area in the skin color area. Then the red eyes are searched within the visage. As a result, the search area is relatively large, the search speed is relatively slow, and the precision is adversely affected.

SUMMARY OF THE INVENTION

It is therefore an object of the invention to provide a method of processing red eyes in digital images that can overcome the problems of the prior art. According to the invention, the method of processing red eye in digital images can be adapted to various situations and provide high precision in the localization of red eyes to automatically eliminate the red eye effects without user intervention.

According to an embodiment of the processing method of the invention, a skin area is first detected in the image. Then all inner boundaries within the skin color area are picked up, and the specific inner boundaries that match with an eyelid quadratic curve are subsequently determined to localize the eyelid area. Lastly, red pixels in the eyelid area are detected and filled up.

According to other variations, a visage area is first determined within the skin color area. All inner boundaries within the visage area then are picked up. The inner boundaries of the visage area then are matched with the eyelid quadratic curve to localize the eyelid area. Lastly, red pixels in the eyelid area are detected and filled up.

According to further variations, once the eyelid area is localized, all inner boundaries within the eyelid area are picked up and matched with an iris quadratic curve to determine the location of the iris area. Red eye pixels then are detected within the iris area, and subsequently filled up.

With the processing method of the invention, the eyelid area is determined either in the skin color area or the visage area, which reduces the red eye search area and, consequently, detection errors of the red eye location. By using quadratic curve models to determine the eyelid area and the iris area, red eye localization is more efficiently and more precisely performed, and red eye detection speed is faster.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
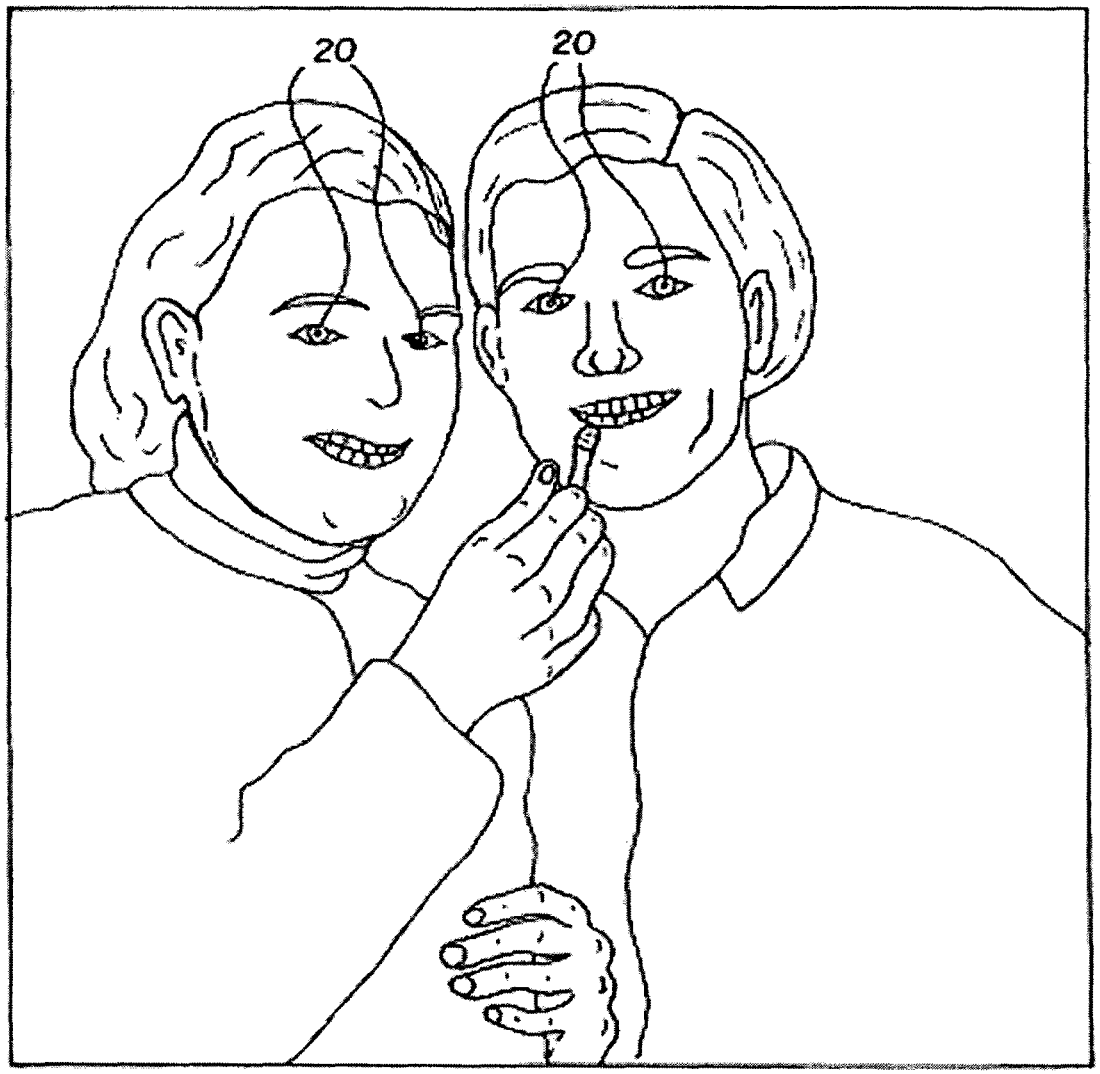
FIG. 1 is a schematic view of the location of a red eye.

FIG. 1 is a schematic view illustrating the location of red eye on digital images. A flash of a photographic camera may produce red eye effect on a photo due to light reflection on the eye retina, which is full of red capillaries. Red eye effect therefore negatively affects the aesthetic aspect of the image. The red eye effect usually appears at the location 20 of a digital image, and has to be eliminated.

Figure 2:
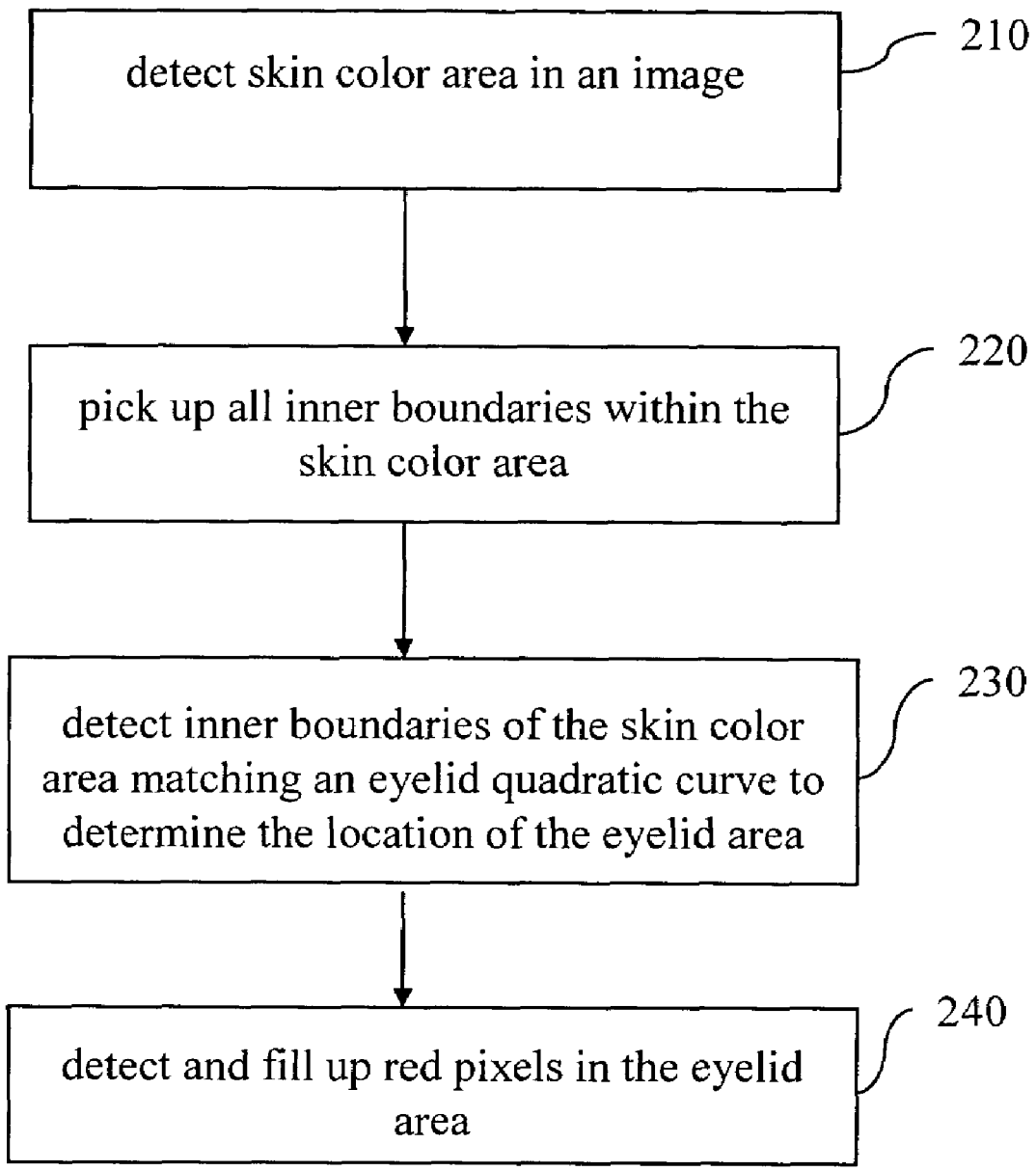
FIG. 2 is a flowchart of a method of processing red eye in digital images according to a first embodiment of the invention.

Once the digital image has been input into a computer, it may be processed by diverse image processing methods to eliminate the undesired red eye. The most important aspects of a method for processing red eyes include the search speed, the precision in red eye localization, and the color coverage of the red eye. FIG. 2 is a flowchart of a method of processing digital image red eye according to an embodiment of the invention. In the processing method according to the invention, an important step is red eye localization, by which red eye location is detected on an inputted image. The image capture equipment used to detect and pick up diverse objects on an image includes various factors, and image pickup factors such as illumination and background features particularly influence the detection of the red eye location. In red eye localization, skin color first has to be identified, so as to detect a skin color area on the image (step 210). A continuous close area of skin color pixels constitutes a skin color area. According to an embodiment of the invention, skin color detection is accomplished under HIS format. HIS format reflects the manner by which human beings observe color, and is advantageous for image processing. In utilization of color information, an advantage of the HIS format is that it enables the separation of the illumination (I) and the two factors reflecting the color characteristics, e.g. color hue (H) and color saturation (S).According to the HIS value of the image pixels, it is determined whether the pixels are skin color pixels. A person with yellow skin will have the skin color defined as follows:

$24 < H < 40;$ $0.2*255 < S < 0.6*255;$ and $1 > 0.5*255$

Figure 3:
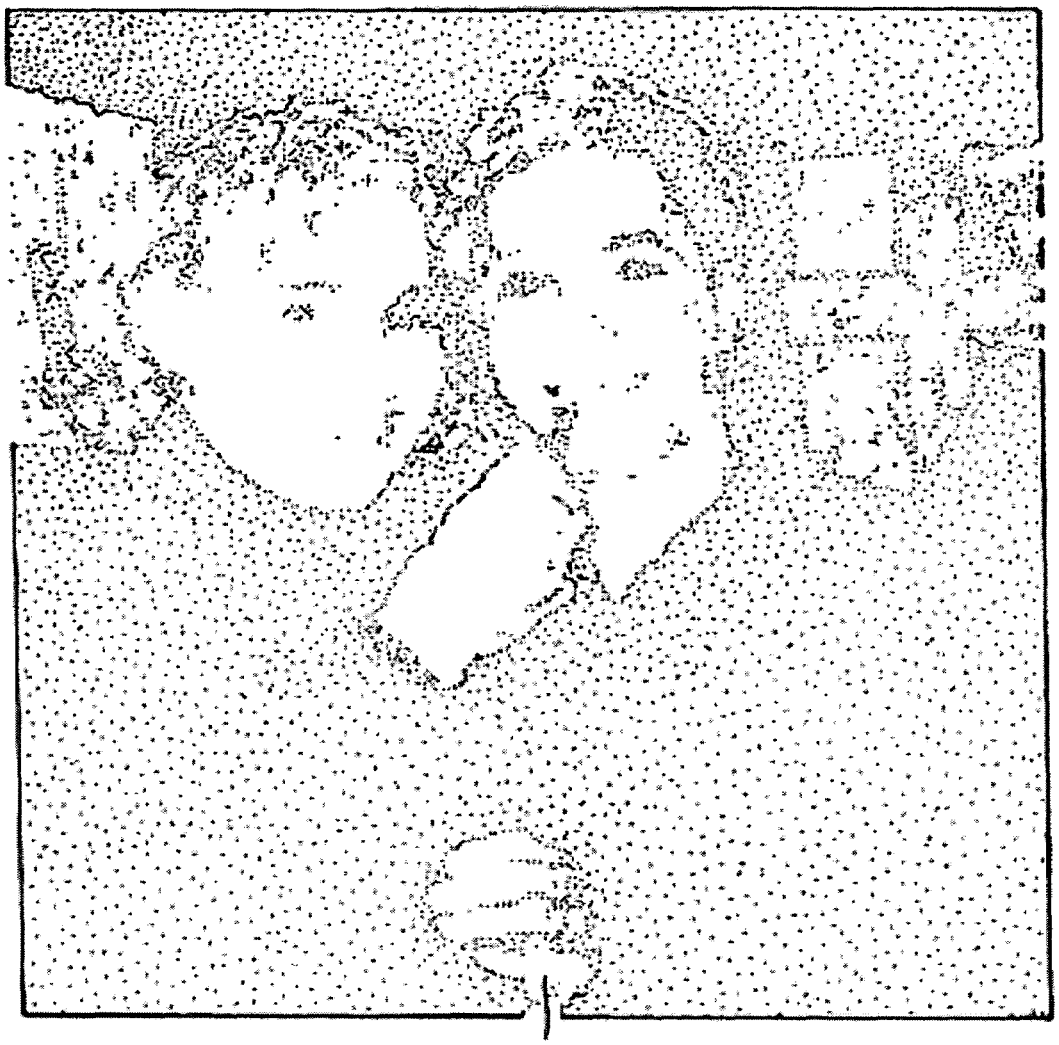
FIG. 3 is a schematic view illustrating the pickup of skin color area according to the invention.

According to the above parameter ranges, the skin color pixels of the image are marked up. FIG. 3 is a schematic view illustrating the detected skin color area and, in particular, the skin color area marked up after having been detected. The skin color area is then processed to detect the eye contour, e.g. the eyelid area. Within the detected eyelid area, a red point then is searched. According to the above processing steps, the search area is substantially reduced. Eyelid area localization includes picking up all inner boundaries in the skin color area (step 220), which correspond to inner object boundaries within the skin color area. By using these inner object boundaries, each inner object thereby can be distinguished from one another. These inner boundaries typically are distinction limits distinguishing pixels of greater color difference. To determine an inner boundary, the skin color area is first converted into a gray scale image. Gray scale gradients of the gray scale image then are calculated. The gray scale gradients of pixels in two adjacent rows are compared. If a gray scale gradient is greater than a gradient threshold value, the corresponding pixels are marked up as being part of an inner boundary. In the present embodiment, the gradient threshold value exemplary is 10. In other words, the pixels with a gray scale gradient value greater than 10 are considered as being part of an inner boundary. Alternatively, the inner boundaries may be determined via a peripheral edge detection technique. Peripheral edge detection typically uses 8 neighbor pixels to determine whether a given pixel is a peripheral edge element.The given pixel is compared with each of the 8 neighbor pixels. If the resulting difference is significant, it is considered as an edge element.

The determined boundaries may be either connecting curve sections or isolated curve sections. Because an eyelid generally has a shape matching a parabola, the determined boundaries therefore are matched with an eyelid quadratic model curve (step 230). The quadratic curve is expressed as follows: $Y=aX^2+bX+c$. In this relationship, the eyelid quadratic curve is symmetrical relative to the axis X, wherein if $0.01 < -a < 0.05$ the eyelid quadratic curve is an upper eyelid quadratic curve; and if $0.01 < a < 0.05$ the eyelid quadratic curve is a lower eyelid quadratic curve. If two boundaries are found to correspond to the upper and lower eyelid quadratic curve, the area enclosed by these boundaries is likely to be an eyelid area. However, if the horizontal coordinates of the respective apexes of these two quadratic curves are excessively distant from each other, the found curves probably are not the eyelid contour. According to an embodiment of the invention, a horizontal coordinate difference between the respective apexes of the two quadratic curves is further evaluated; if the horizontal coordinate error between the apexes is smaller than an apex reference value, the area enclosed by the found quadratic curves is considered as an eyelid area. According to an embodiment, the apex reference value is 4. In the RGB color area, R represents red, and a red point means that its pixel has a value R greater than the value G and the value B. This is the reason that the HIS format is converted into RGB format so as to detect a red pixel. The red eye area then is filled up (step 240). All red eyes are filled up with gray color: the red eye color image is converted into a gray scale image from which red eye then is eliminated.

Figure 4:
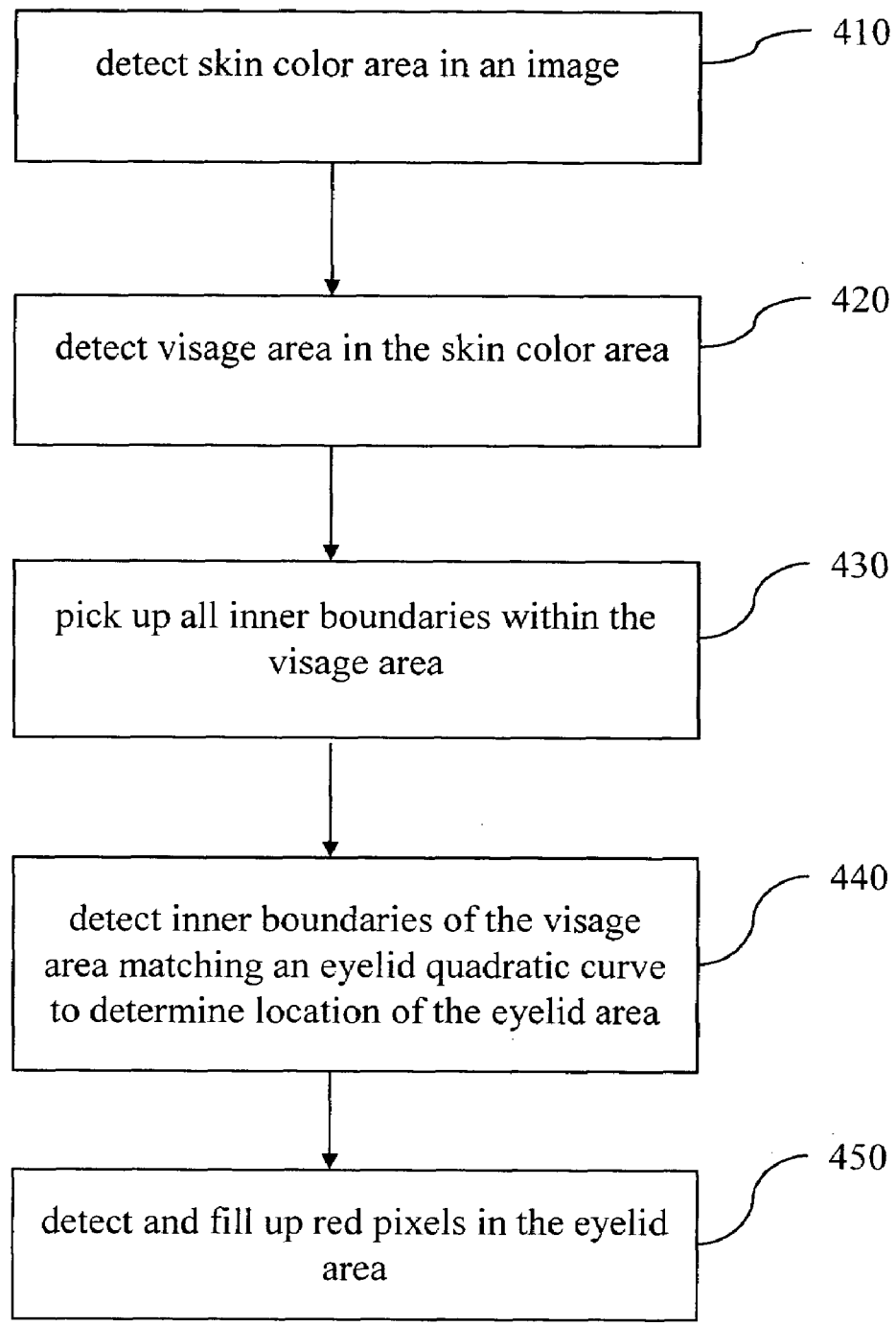
FIG. 4 is a flowchart of a method of processing red eye in digital images according to a second embodiment of the invention.

The flowchart of FIG. 4 schematically illustrates a method of processing red eye in a digital image according to a second embodiment of the invention. First, a skin color area of the image is detected (step 410). The skin color area is typically determined from the range of HIS parameters. Then a visage area is localized in the skin color area (step 420). In an image, the visage area is the largest area of a skin color area. To determine the visage area, the number of pixels and the number of pixel rows in the skin color area are evaluated: if the skin color area has a number of pixels greater than a pixel number reference and a number of pixel rows greater than a row number reference, the corresponding closed area is considered as a visage area. Usually, a visage area has a number of pixels greater than 5000, and a number of pixel rows greater than 100. Once the visage area has been determined, other skin color area with fewer pixels such as the arms can be filtered out, and the red eye then is searched only in the visage area so as to reduce the search area. Subsequently, all inner boundaries in the visage area are picked up (step 430). Inner boundary determination within the visage area can be performed by evaluating the image gray scale graduations, as described above. Alternatively, a peripheral edge detection technique can be used to determine the inner boundaries of the visage area. All the determined inner boundaries are then matched with an eyelid quadratic curve model to determine the adequate eyelid quadratic curves (i.e. with matching coefficients a, b, and c). Horizontal coordinate error between the respective apexes of the determined quadratic curves is then evaluated; if the apex horizontal coordinate error is smaller than the apex reference value 4, the area enclosed by the determined eyelid quadratic curves is considered as an eyelid area (step 440).Once the eyelid area has been determined, red pixels in the eyelid area are detected and filled up (step 450).

Figure 5:
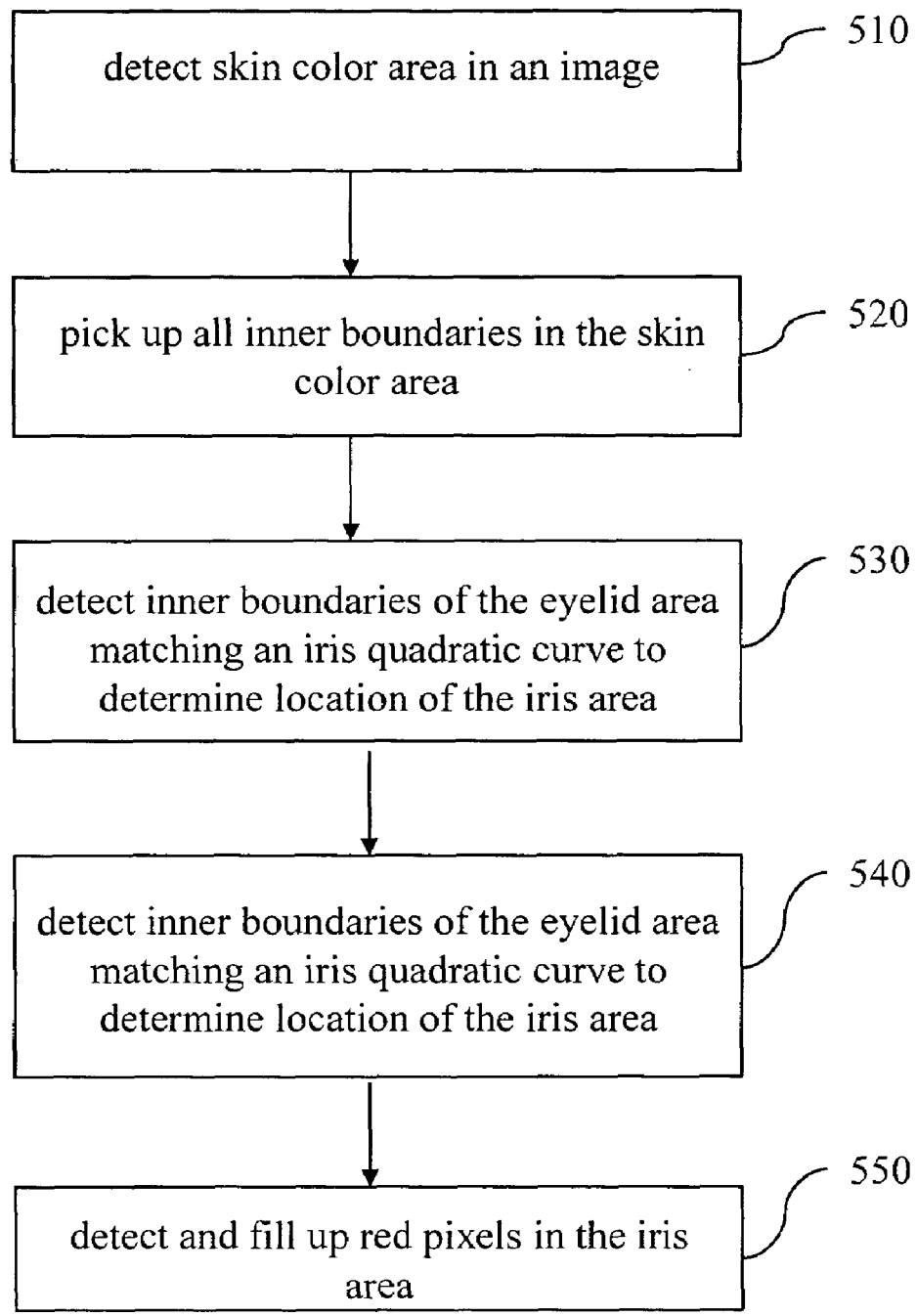
FIG. 5 is a flowchart of a method of processing red eye in digital images according to a third embodiment of the invention.

The flowchart of FIG. 5 schematically illustrates a third embodiment of the invention. First, a skin color area is detected in the image (step 510). A skin color area is typically determined from the range of HIS parameters. Subsequently, all inner boundaries in the skin color area are picked up (step 430).Inner boundary determination can be performed by evaluating the gray scale gradients of a gray scale image in the same manner as described above. Alternatively, a peripheral edge detection technique can be used to determine the inner boundaries of the skin color area. Then, the inner boundaries of the skin color area matching eyelid quadratic curves are determined. In particular, the eyelid quadratic curves are expressed as follows: $Y=aX^2+bX+c$, wherein if $0.01 < -a < 0.05$ the quadratic curve is an upper eyelid quadratic curve, and if $0.01 < a < 0.05$ the quadratic curve is a lower eyelid quadratic curve. Two boundaries that respectively correspond to the upper and lower eyelid quadratic curves are used to localize the eyelid area. Once the boundaries corresponding to upper and lower eyelid quadratic curves are found, horizontal coordinate error between their respective apexes is evaluated. If the apex horizontal coordinate error is smaller than the apex reference value 4, the area enclosed by the eyelid quadratic curves is considered an eyelid area (step 530).

The eyelid area includes an iris area, which corresponds to the colored annular periphery of the eye pupil. The iris area has the function of adjusting the pupil size, and is the visible annular portion between the pupil and the sclera. Two parabola curves, e.g. left and right curves, can be used to model the shape of the iris area. Red pixels of red eye are concentrated in the iris area. If the iris area is localized, the determination of red pixels and red eye location therein will be more precise. According to an embodiment of the invention, once the eyelid area has been determined, the iris area then is detected. The localization of the iris area can be processed via similar techniques implemented to determine the eyelid area. The difference is that the iris area is delimited by two parabola curves symmetrical in respect to the axis Y. The iris quadratic curves are defined by the following quadratic expression:

$$X=aY^2+bY+c,$$

wherein if a>0 the identified boundary is a left iris quadratic curve, and if a<0 the identified boundary is a right iris quadratic curve. The inner boundaries of the eyelid area are compared with the iris quadratic curve model (step 540) to determine specific boundaries that particularly match left and right iris quadratic curves. The area enclosed by the boundaries that effectively matches the left and right iris quadratic curves is the iris area. Red pixels then are detected in the iris area, and subsequently filled up (step 550).

Figure 6:
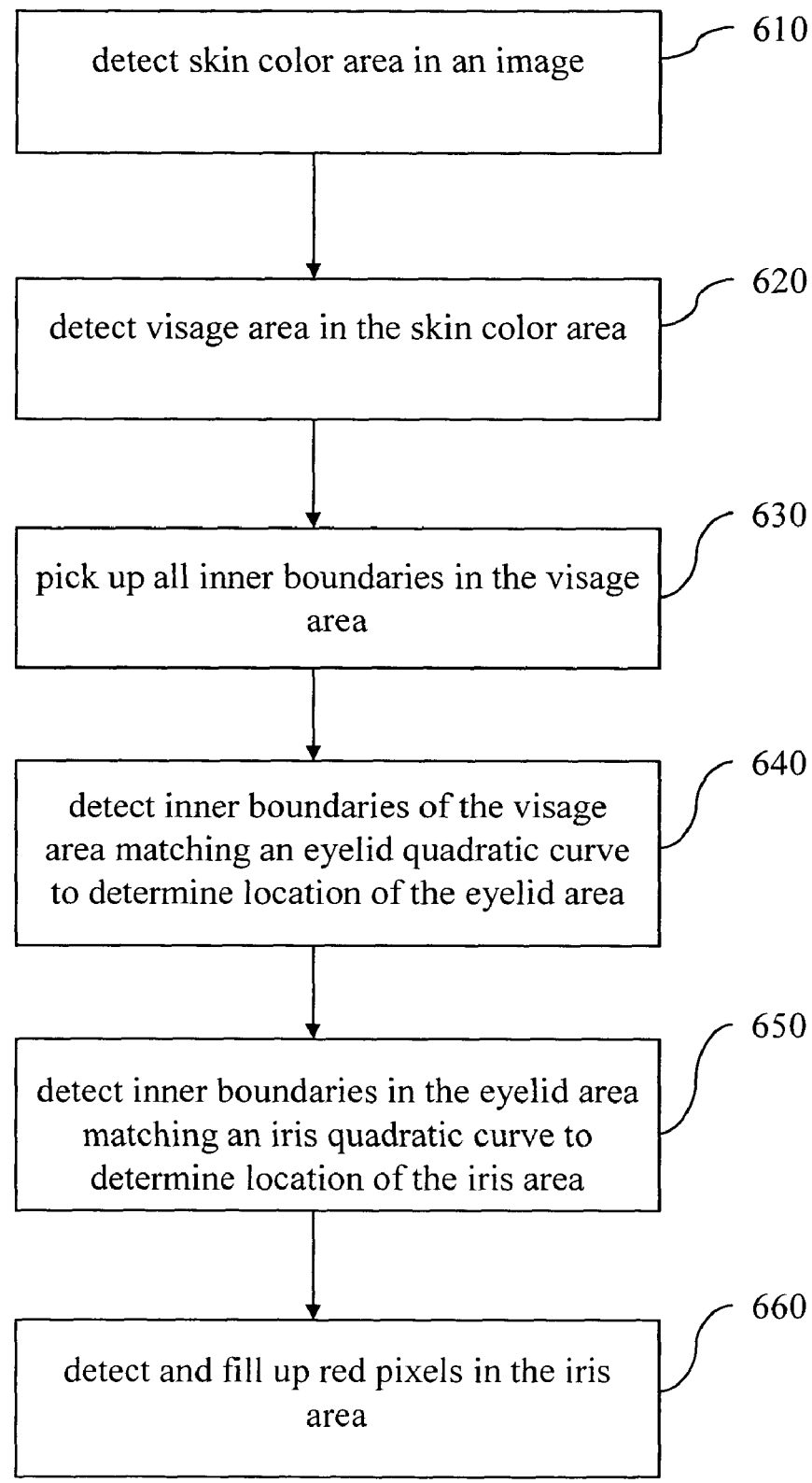
FIG. 6 is a flowchart of a method of processing red eye in digital images according to a fourth embodiment of the invention.

The flowchart of FIG. 6 schematically illustrates a fourth embodiment of the invention. First, a skin color area is detected in the image (step 610). Then the visage area is detected in the skin color area (step 620). All inner boundaries in the visage area are subsequently detected (step 630). The inner boundaries of the visage area are matched with the eyelid quadratic curve to determine the proper upper and lower eyelid quadratic curves. Horizontal coordinate error between the respective apexes of the matched quadratic curves is then evaluated; if the apex horizontal coordinate error is smaller than an apex reference value, the area enclosed by the eyelid quadratic curves is considered an eyelid area (step 640). In this embodiment, the apex reference value is, for example, 4. Subsequently, the inner boundaries of the eyelid area are matched with the iris quadratic curve to determine the iris area (step 650). Lastly, red pixels in the iris area are localized and filled up (step 660). Incorporating the detections of visage area and iris area advantageously allows a more precise localization of the red eye.

It will be apparent to the person skilled in the art that the invention as described above may be varied in many ways. Such variations are not to be regarded as a departure from the spirit and scope of the invention, and all such modifications as would be obvious to one skilled in the art are intended to be included within the scope of the following claims.

What is claimed is:

1. A method of processing red eye in digital images, comprising:
    detecting a skin color area in an image;
    picking up all boundaries within the detected skin color area;
    detecting one boundary within the skin color area that matches with an eyelid quadratic curve to determine an eyelid area;
    detecting red color pixels in the eyelid area; and
    filling up the detected red color pixels with a predetermined color, thereby eliminating the red eye in the image.

2. The processing method of claim 1, wherein detecting a skin color area in the image further comprises:
    converting the image into an HIS format;
    marking pixels with HIS values within the skin color area as skin color pixels; and
    marking the continuous area composed by the skin color pixels as a skin color area.

3. The processing method of claim 1, picking up all boundaries within the detected skin color area further comprises:
    converting the skin color area into a gray scale image;
    calculating a gradient of the gray scale image;
    comparing the gradient values between two adjacent rows of pixels; and
    marking as being part of a boundary the pixels for which the gradient value is greater than a gradient threshold reference.

4. The processing method of claim 1, wherein picking up all boundaries within the detected skin color is performed by marking detected edges as boundaries.

5. The processing method of claim 1, wherein picking up all boundaries within the detected skin color further comprises:
    detecting a visage area within the skin color area; and
    picking up all boundaries within the visage area.

6. The processing method of claim 5, wherein detecting a visage area within the skin color area further comprises:
    calculating a number of pixels and a number of pixel rows inside the skin color area; and
    marking as a visage area a closed area of the skin color area that has the number of pixels and the number of pixel rows respectively greater than a pixel number reference and a pixel row number reference.

7. The processing method of claim 1, wherein determining the eyelid area further comprises:
    according to a expression of the eyelid quadratic curve, determining upper and lower eyelid quadratic curves;
    calculating a horizontal coordinate error between respective apexes of the upper and lower eyelid curves; and
    if the horizontal coordinate error is smaller than an apex reference value, an area enclosed by the upper and lower eyelid quadratic curve is an eyelid area.

8. The processing method of claim 1, wherein a expression of the eyelid quadratic curve is:

$$Y=aX^2+bX+c,$$

wherein if $0.01<-a<0.05$ the eyelid quadratic curve is an upper eyelid quadratic curve, and if $0.01<a<0.05$ the eyelid quadratic curve is a lower eyelid quadratic curve.

9. The processing method of claim 1, further including detecting inner boundaries of the eyelid area that match with an iris quadratic curve to determine an iris area.

10. The processing method of claim 9, wherein a expression of the iris quadratic curve is:

$$X=aY^2+bY+c,$$

wherein if a>0 the iris quadratic curve is a left iris quadratic curve, and if a<0 the iris quadratic curve is a right iris quadratic curve.

* * * * *